(12) United States Patent
Kurotsu

(10) Patent No.: US 6,654,263 B2
(45) Date of Patent: Nov. 25, 2003

(54) LINEAR REGULATOR WITH SWITCHED CAPACITANCE OUTPUT

(75) Inventor: Satoru Kurotsu, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 10/127,410

(22) Filed: Apr. 23, 2002

(65) Prior Publication Data
US 2002/0153869 A1 Oct. 24, 2002

(30) Foreign Application Priority Data
Apr. 24, 2001 (JP) ....................... 2001-125517

(51) Int. Cl.[7] ............................... H02M 3/18
(52) U.S. Cl. ....................................... 363/60
(58) Field of Search ................. 323/288, 274; 363/59, 60; 307/110; 327/536, 535

(56) References Cited

U.S. PATENT DOCUMENTS

| | | | |
|---|---|---|---|
| 4,703,249 A | * 10/1987 | De La Plaza et al. | 323/316 |
| 5,548,206 A | 8/1996 | Soo | |
| 5,973,944 A | * 10/1999 | Nork | 363/60 |
| 6,411,531 B1 | * 6/2002 | Nork et al. | 363/60 |
| 6,438,005 B1 | * 8/2002 | Walter | 363/60 |
| 6,522,558 B2 | * 2/2003 | Henry | 363/60 |

* cited by examiner

Primary Examiner—Shawn Riley
(74) Attorney, Agent, or Firm—Rabin & Berdo, P.C.

(57) ABSTRACT

A reference voltage for obtaining a desired output voltage value, and an output voltage are inputted to an operational amplifier. A PMOS transistor whose on/off operation is controlled by the operational amplifier, outputs an internal node voltage therefrom. A switch control circuit outputs a signal constant in duty ratio, for activating CHG switches and DCHG switches respectively. A voltage dividing capacitor and an output capacitor respectively repeat charging and discharging based on a switching pulse constant in duty ratio. Accordingly, a stable output voltage obtained by series/parallel connection switching operations of two capacitors results in ½ of the internal node voltage.

9 Claims, 9 Drawing Sheets

LINEAR REGULATOR WITH SWITCHED CAPACITANCE OUTPUT

BACKGROUND OF THE INVENTION

1. Field of the Invention

The present invention relates to a power supply device, and particularly to a power supply device for performing DC—DC power conversion by use of capacitors.

This application is a counterpart of Japanese Patent Application, Serial Number 125517/2001, filed Apr. 24, 2001, the subject matter of which is incorporated herein by reference.

2. Description of the Related Art

A switched capacitor (hereinafter abbreviated as "SC") type power supply device comprising a plurality of capacitors and a plurality of switches for respectively changing connected states of these capacitors is easy to bring into less size because it needs no transformers and coils. According to this type of SC type power supply device, a system on-chip including the power supply device can be implemented and hence a reduction in the cost of a system can be expected. Technologies related to conventional SC type power supply devices have been described in the following references.

Reference 1: National Semiconductor Corporation, "LM3352 Regulated 200 mA Buck-Boost Switched Capacitor DC/DC Converter", Product Catalogue", March 1999

Reference 2: David H. Soo, National Semiconductor Corporation, "SYSTEM AND METHOD FOR DUAL MODE DC—DC POWER CONVERSION", U.S. Pat. No. 5,548,206.

When the SC type power supply device is used as one for step-down (input voltage>output voltage), n capacitors included in the SC type power supply device are electrically connected in series between a power supply (VDD) and ground (GND) in a charging cycle. At this time, the respective capacitors are charged by a voltage VDD/n. In a subsequent discharging cycle, the n capacitors are electrically connected in parallel between a voltage output terminal of the SC type power supply device and ground. Thus, the voltage VDD/n is outputted from the voltage output terminal. By repeating the charging cycle and the discharging cycle at high speed, the SC type power supply device is capable of outputting the voltage VDD/n from the voltage output terminal on a steady basis.

Thus, according to the conventional SC type power supply device, the value of an output voltage Vout can also be fixed on a circuit basis according to the number of capacitors (n) and the contents of their connections. As an alternative, however, the value thereof may be adjusted so as to coincide with a reference voltage Vref ($\leq$VDD/n). In this case, however, the output voltage Vout and the reference voltage Vref are compared with each other by means of an operational amplifier or the like. When the output voltage Vout becomes lower than the reference voltage Vref, it is necessary to perform a so-called intermittent switching operation for making the discharging cycle effective.

The contents of circuits for the conventional SC type power supply device is shown in FIG. 8, and operating waveforms thereof are illustrated in FIG. 9.

An operational amplifier 600 compares an output voltage VOUT with a reference voltage VREF brought to a desired output voltage. DCHG switches 603 and 604 are respectively brought to a conducting state when VOUT$\leq$VREF and only during the discharging cycle. Since the output voltage VOUT obtained as a result thereof is compared with the reference voltage VREF by means of the operational amplifier 600, the output voltage is adjusted so as to take the output voltage VOUT=reference voltage VREF.

During the charging cycle, a voltage dividing capacitor 605 and an output capacitor 606 are electrically connected in series between the power supply voltage VDD and ground GND. At this time, the voltage dividing capacitor 605 is charged by a potential of (power supply voltage VDD–output voltage VOUT), whereas the output capacitor 606 is charged by the output voltage VOUT. On the other hand, the voltage dividing capacitor 605 and the output capacitor 606 are electrically connected in parallel between the output voltage VOUT and ground GND during the discharging cycle. At this time, the voltage dividing capacitor 605 is discharged while the difference (power supply voltage VDD–output voltage VOUT) in potential between its both terminals is being held.

According to the conventional SC type power supply device as described above, when the reference voltage VREF for obtaining the desired output voltage value is set lower than the stable output voltage obtained by the series/parallel connection switching operations of the voltage dividing capacitor 605 and the output capacitor 606, the discharging operations of both capacitors are intermittently performed. In this case, the voltages applied across the respective capacitors during the charging and discharging cycles cannot be kept in equilibrium, thus resulting in the following problems.

(1) Since capacitors different in voltage are connected in parallel during a discharging cycle, a spike current flows between the capacitors, so that switching noise is produced.

(2) A ripple voltage in output voltage increases.

(3) Since a terminal voltage on the negative side of each capacitor is depressed low as compared with ground GND during the discharging cycle, the potential on a ground GND line varies, thus exerting a bad influence on other circuit characteristics.

(4) Since the terminal voltage on the negative side of each capacitor is depressed as compared with ground ND during the discharging cycle, a parasitic PN diode of an NMOS transistor is taken in he forward direction, thereby varying a characteristic as a power supply circuit.

The present invention has been made in view of the above problems. It is an object of the present invention to provide a power supply device which stably outputs a voltage adjusted to a desired value and takes into full consideration even electrical influences over other circuits.

SUMMARY OF THE INVENTION

In order to solve the above problems, the present invention provides a power supply device equipped with a switched capacitor type power supply circuit and an internal node voltage adjusting circuit. The switched capacitor type power supply circuit charges a plurality of built-in capacitors by use of an internal node voltage during a charging cycle and discharges the plurality of charged capacitors during a discharging cycle to thereby generate an output voltage corresponding to the internal node voltage. Further, the internal node voltage adjusting circuit compares the output voltage and a reference voltage adjusted to a predetermined level and adjusts the internal node voltage according to the result of comparison. The present power supply device changes connected states of a plurality of the capacitors to a series connection or a parallel connection during the charging cycle and the discharging cycle to thereby perform DC—DC power conversion. A switching pulse use for performing series/parallel connection switching operations of the respective capacitors is kept constant in duty ratio (i.e., time intervals for the charging cycle and the discharging cycle are substantially made equal to each other), so that the differences in potential between both terminals of the respective capacitors in the switched capacitor type power supply circuit are kept substantially identical to one another even during both the charging cycle and the discharging cycle.

Preferably, the switched capacitor type power supply circuit detects the value of an output current generated based on the output voltage and stops the operation of charging the plurality of capacitors and the operation of discharging them when the detected value is smaller than a predetermined value. According to such a configuration, power consumed by the power supply device can be reduced.

There is further provided output voltage selecting means for selecting any of the internal node voltage, the output voltage and a second output voltage and outputting it to the outside. Consequently, an improvement in power conversion efficiency is realized.

Further, it is preferable to provide a second switched capacitor type power supply circuit for charging a plurality of built-in second capacitors by using an internal node voltage during a charging cycle and discharging the charged second capacitors during a discharging cycle to thereby generate a second output voltage corresponding to the internal node voltage, and power supply circuit selecting means for selecting either the switched capacitor type power supply circuit or the second switched capacitor type power supply circuit and bringing it to an enable state. The power supply circuit selecting means is configured so as to select either the switched capacitor type power supply circuit or the second switched capacitor type power supply circuit with the level of the reference voltage as the reference. According to such a configuration, a further improvement in power conversion efficiency is achieved.

The second switched capacitor type power supply circuit is configured so as to detect the value of a second output current generated based on the second output voltage and stop charging and discharging operations for the plurality of second capacitors when the detected value is smaller than a predetermined value (see claim 11). According to such a configuration, power consumption of the power supply device can be reduced.

The internal node voltage adjusting circuit (resistor step-down type power supply circuit) may preferably be provided with internal node voltage output means for outputting an internal node voltage during period other than the discharging cycle. A transistor may be adopted as the internal node voltage output means. The transistor directly assumes the role as a discharging switch for the plurality of capacitors included in the switched capacitor type power supply circuit in addition to the execution of the role of outputting the internal node voltage. Accordingly, the power supply device is simplified in circuit configuration and made compact.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Figure 1:
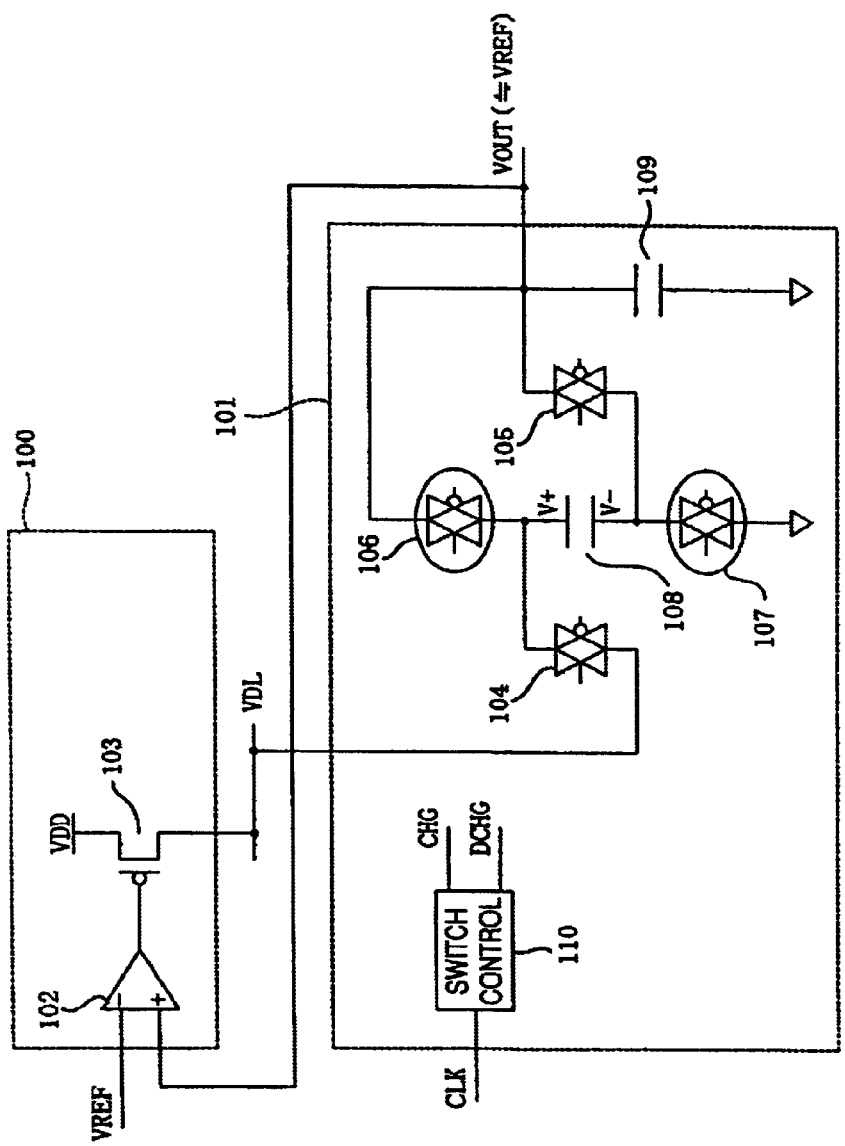
FIG. 1 is a circuit diagram showing a configuration of a power supply device according to a first embodiment of the present invention.

Preferred embodiments of power supply devices according to the present invention will hereinafter be described in detail with reference to the following accompanying drawings. Incidentally, structural elements each having the same function and configuration in the following description and accompanying drawings are respectively identified by the same reference numerals and the description of certain common elements will therefore be omitted.

(First Preferred Embodiment)

A power supply device according to a first embodiment of the present invention comprises a resistor step-down type power supply circuit (internal node voltage adjusting circuit) 100 and a switched capacitor (hereinafter abbreviated as "SC") type power supply circuit 101 as shown in FIG. 1.

The resistor step-down type power supply circuit 100 comprises an operational amplifier 102, and a PMOS transistor 103. The SC type power supply circuit 101 comprises CHG switches 104 and 105 activated by a charge (CHG) signal, DCHG switches 106 and 107 activated by a discharge (DCHG) signal, a voltage dividing capacitor 108, an output capacitor 109 and a switch control circuit 110.

The operational amplifier 102 that belongs to the resistor step-down power supply circuit 100, receives a reference voltage VREF and an output voltage VOUT therein, and has an output terminal electrically connected to the gate of the PMOS transistor 103. The source of the PMOS transistor 103 is electrically connected to a power supply node (potential VDD) and the drain thereof is electrically connected to an internal node (potential VDL).

The voltage dividing capacitor 108 and the output capacitor 109 that belongs to the SC type power supply circuit 101, are electrically series-connected between the internal node (potential VDL) corresponding to an output node of the resistor step-down type power supply circuit 100 and ground GND by the CHG switches 104 and 105 during a charging cycle and electrically connected in parallel between an output voltage VOUT terminal and the ground GND by the DCHG switches 106 and 107 during a discharging cycle.

The switch control circuit 110 receives a clock signal CLK therein and outputs the CHG signal for activating the CHG switches 104 and 105 and the DCHG signal for activating the DCHG switches 106 and 107.

Figure 2:
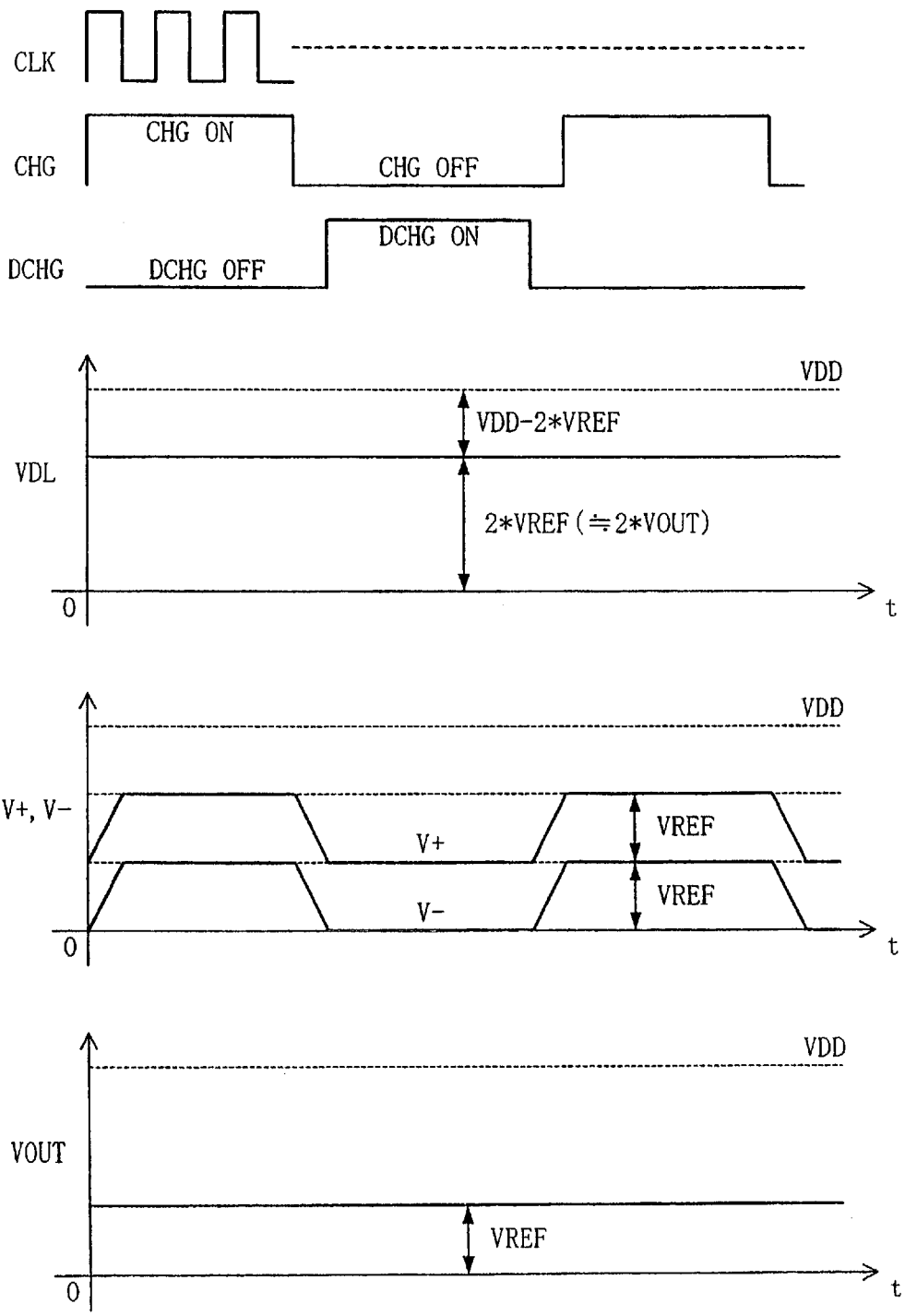
FIG. 2 is a waveform diagram illustrating the operation of the power supply device shown in FIG. 1.

Operating waveforms of the power supply device according to the first embodiment shown in FIG. 1 are shown in FIG. 2.

In the resistor step-down power supply circuit 100, a reference voltage VREF for obtaining a desired output voltage VOUT value, and an output voltage VOUT of the present power supply device are inputted to the operational amplifier 102. The PMOS transistor 103 whose on/off operation is controlled by the operational amplifier 102, outputs an internal node voltage VDL used as an input voltage for the SC type power supply circuit 101.

In the SC type power supply circuit 101, the switch control circuit 110 inputted with the clock signal CLK outputs a CHG signal and a DCHG signal constant in duty ratio, for respectively activating the CHG switches 104 and 105 and the DCHG switches 106 and 107. In the case of the SC type power supply circuit 101, the two capacitors (voltage dividing capacitor 108 and output capacitor 109) respectively repeat charging and discharging, based on a switching pulse constant in duty ratio. Thus, a stable output voltage VOUT obtained by series/parallel connection switching operations of the two capacitors results in ½ of the internal node voltage VDL used as the input voltage for the SC type power supply circuit 101 (VOUT=VDL/2).

The output voltage VOUT is fed back to the operational amplifier 102 that belongs to the resistor step-down type power supply circuit 100, where it is compared with the reference voltage VREF. The operational amplifier 102 controls the PMOS transistor 103, based on the result of comparison between the output voltage VOUT and the reference voltage VREF. Thereafter, the PMOS transistor 103 adjusts the internal node voltage VDL to twice the reference voltage VREF in such a manner that the output voltage VOUT and the reference voltage VREF become equal to each other (VDL=2×VREF).

Thus, the power supply device according to the first embodiment is provided with a feedback loop about the output voltage VOUT. Owing to such a circuit configuration, the output voltage VOUT is adjusted to reach the same level as the reference voltage VREF.

In the SC type power supply circuit 101 as described above, the switching pulse used in the series/parallel connection switching operations of the voltage dividing capacitor 108 and the output capacitor 109 is kept constant in duty ratio. Accordingly, the power supply device according to the first embodiment is capable of outputting the stable output voltage VOUT (=VDL/2) obtained by the series/parallel connection switching operations of the capacitors. Further, the resistor step-down type power supply circuit 100 adjusts the internal node voltage VDL to a value, i.e., 2×VREF obtained by stepping down a potential corresponding to (VDD−2×VREF) from a power supply voltage VDD. Accordingly, the power supply device according to the first embodiment can be brought to such a steady DC power supply that the output voltage VOUT becomes equal to the reference voltage VREF (VOUT=VREF).

Further, since the voltage dividing capacitor 108 and the output capacitor 109 that belong to the SC type power supply circuit 101, are both repeatedly charged and discharged with the same potential (output voltage VOUT) even in both the charging cycle and the discharging cycle, the difference in potential between the capacitors does not occur.

As described above, the power supply device according to the first embodiment includes the resistor step-down type power supply circuit 100 and the SC type power supply circuit 101. Since the duty ratio of the switching pulse for switching the series/parallel connections between the voltage dividing capacitor 108 an the output capacitor 109 is kept constant, the SC type power supply circuit 101 is capable of outputting the stable output voltage VOUT= VDL/2 obtained by the series/parallel connection switching operations of the capacitors. The resistor step-down type power supply circuit 100 is capable of stepping down the internal node voltage VDL by the potential corresponding to (VDD−2×VREF) from the power supply voltage VDD, thereby adjusting it to 2×VREF. Owing to such a configuration, the following advantageous effects are obtained.

It is possible to obtain such a steady DC power supply that the output voltage VOUT coincides with the reference voltage VREF.

The series/parallel connection switching operations of the voltage dividing capacitor 108 and the output capacitor 109 are performed by the switching pulse constant in duty ratio. Therefore, the same potential (VDL/2) is applied to the respective capacitors even in both the charging and discharging cycles, whereby the connection switching operations in an equilibrium state are realized. As a result, the generation of switching noise can be suppressed and a ripple component of the output voltage VOUT can be reduced.

During the discharging cycle, the potential at a negative-side terminal of the voltage dividing capacitor 108 is no longer depressed low as compared with the ground GND. Thus, a change in the potential on a ground GND line, which exerts a bad influence on other circuit characteristics, is not developed.

During the discharging cycle, the potential at the negative-side terminal of the voltage dividing capacitor 108 is not depressed to be lower than the ground GND. Accordingly, a PN junction diode parasitic on an NMOS transistor constituting the DCHG switch 107 is not brought to the forward direction. As a result, the stable operation of the power supply circuit is realized.

(Second Preferred Embodiment)

Figure 3:
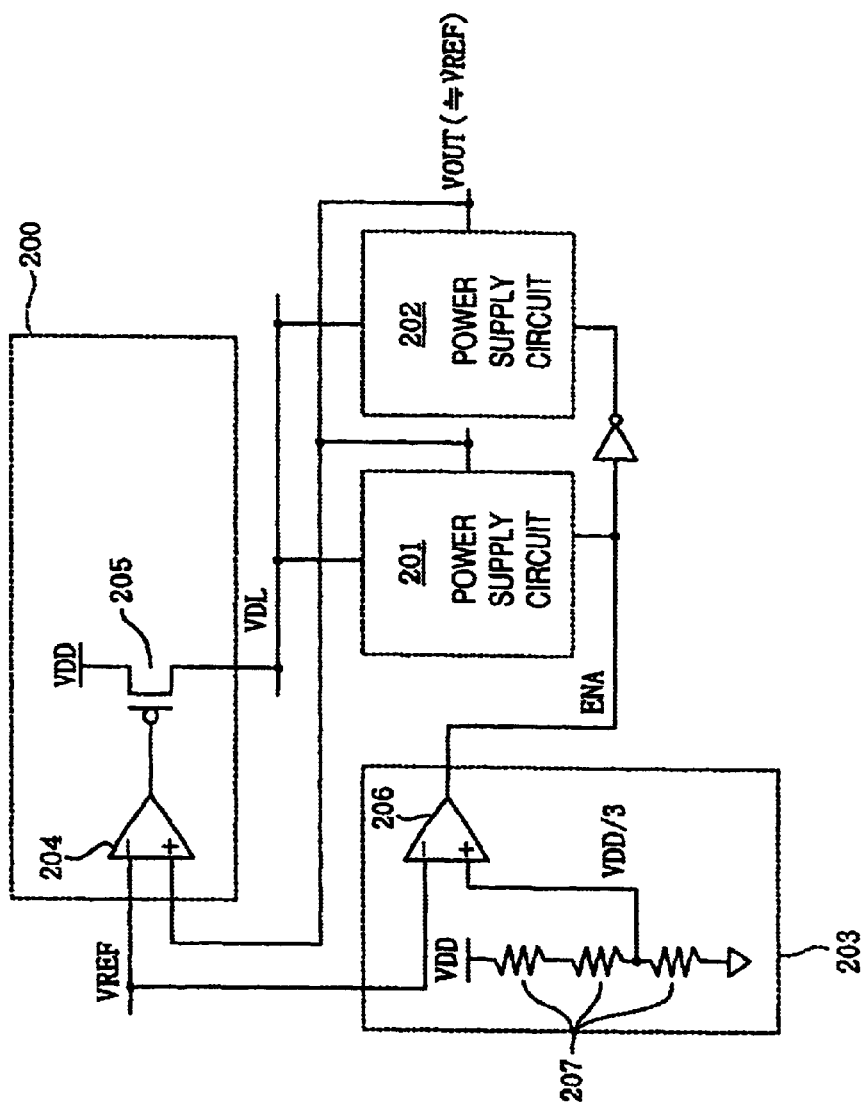
FIG. 3 is a circuit diagram depicting a configuration of a power supply device according to a second embodiment of the present invention.

A power supply device according to a second embodiment of the present invention comprises a resistor step-down type power supply circuit 200, an SC type power supply circuit 201, an SC type power supply circuit 202, and a VDD-VREF level detector circuit 203 as shown in FIG. 3.

The SC type power supply circuit 201 and the SC type power supply circuit 202 are different from each other in the number of built-in capacitors and series/parallel switching operations of the capacitors. Therefore, they output voltages different from each other. The embodiment of the present invention will be described below in line with the case where the SC type power supply circuit 201 is configured so as to output an internal node voltage VDL/3, for example, and the SC type power supply circuit 202 is configured so as to output an internal node voltage VDL/2, for example. Incidentally, one or two or more SC type power supply circuits, which output different voltages, may be provided according to the size of the power supply device in addition to the SC type power supply circuit 201 and the SC type power supply circuit 202.

The VDD-VREF level detector circuit 203 compares a power supply voltage VDD and a reference voltage VREF and outputs a select signal ENA for selecting the optimum SC type power supply circuit. The VDD-VREF level detector circuit 203 comprises an operational amplifier 206 and three resistors 207. In the present embodiment, the three resistors, 207 each having the same resistance value R are connected in series between the power supply voltage VDD and ground GND. The reference voltage VREF and a voltage VDD/3 obtained by dividing the power supply voltage VDD by the three resistors 207 are inputted to the operational amplifier 206. The operational amplifier 206 compares the reference voltage VREF and the voltage VDD/3 and outputs a select signal ENA according to the result of comparison thereby. Either one of the SC type power supply circuit 201 and the SC type power supply circuit 202 is selected based on the select signal ENA.

The power supply device according to the second embodiment is substantially identical in basic operation to the power supply device according to the first embodiment. However, the power supply device according to the second embodiment is characterized in that a plurality of the SC type power supply circuits for respectively outputting the voltages different in level from one another, and the optimum SC type power supply circuit capable of being rendered highest in power conversion efficiency is selected by the VDD-VREF level detector circuit 203.

As described above, the SC type power supply circuit 201 included in the power supply device according to the second embodiment shown in FIG. 3 serves so as to output the internal node voltage VDL/3, whereas the SC type power supply circuit 202 serves so as to output the internal node voltage VDL/2.

The reference voltage VREF used for determining the value of the output voltage VOUT is compared with the voltage VDD/3 divided by the three resisters 207 by means of the operational amplifier 206 that belongs to the VDD-VREF level detector circuit 203.

When the reference voltage VREF is equal to ⅓ or less of the power supply voltage VDD, i.e., the reference voltage VREF≦the voltage VDD/3, the VDD-VREF level detector circuit 203 selects the SC type power supply circuit 201 for outputting the voltage VDL/3, based on the select signal ENA. The resistor step-down type power supply circuit 200 steps down the internal node voltage VDL by a potential of (VDD−3×VREF) from the power supply voltage VDD to adjust the internal node voltage VDL to 3×VREF. Since the SC type power supply circuit 201 outputs the voltage VDL/3 therefrom, the power supply device outputs an output voltage VOUT having a voltage level coincident with the reference voltage VREF.

On the other hand, when the reference voltage VREF>the power supply voltage VDD/3, the selection of the SC type power supply circuit 201 makes it unable to obtain the output voltage VOUT coincident with the reference voltage VREF. Therefore, the SC type power supply circuit 202 is selected as an alternative to the SC type power supply circuit 201. The resistor step-down type power supply circuit 200 step down the internal node voltage VDL by a potential of (VDD−2×VREF) from the power supply voltage VDD to adjust the internal node voltage VDL to 2×VREF. Since the SC type power supply circuit 202 outputs the voltage VDL/2, the power supply device outputs an output voltage VOUT having a voltage level coincident with the reference voltage VREF.

Since the power supply device according to the second embodiment is provided with the plurality of SC type power supply circuits for respectively outputting the voltages different in level, and the VDD-VREF level detector circuit 203 for selecting the optimum one of these as described above, the following advantageous effect can be obtained.

The power supply device is capable of coping with a wide range of power supply voltages and output voltages.

Since the most suitable SC type power supply circuit is selected depending on the levels of the power supply voltage VDD and the output voltage VOUT, an improvement in power conversion efficiency can be achieved.

(Third Preferred Embodiment)

Figure 4:
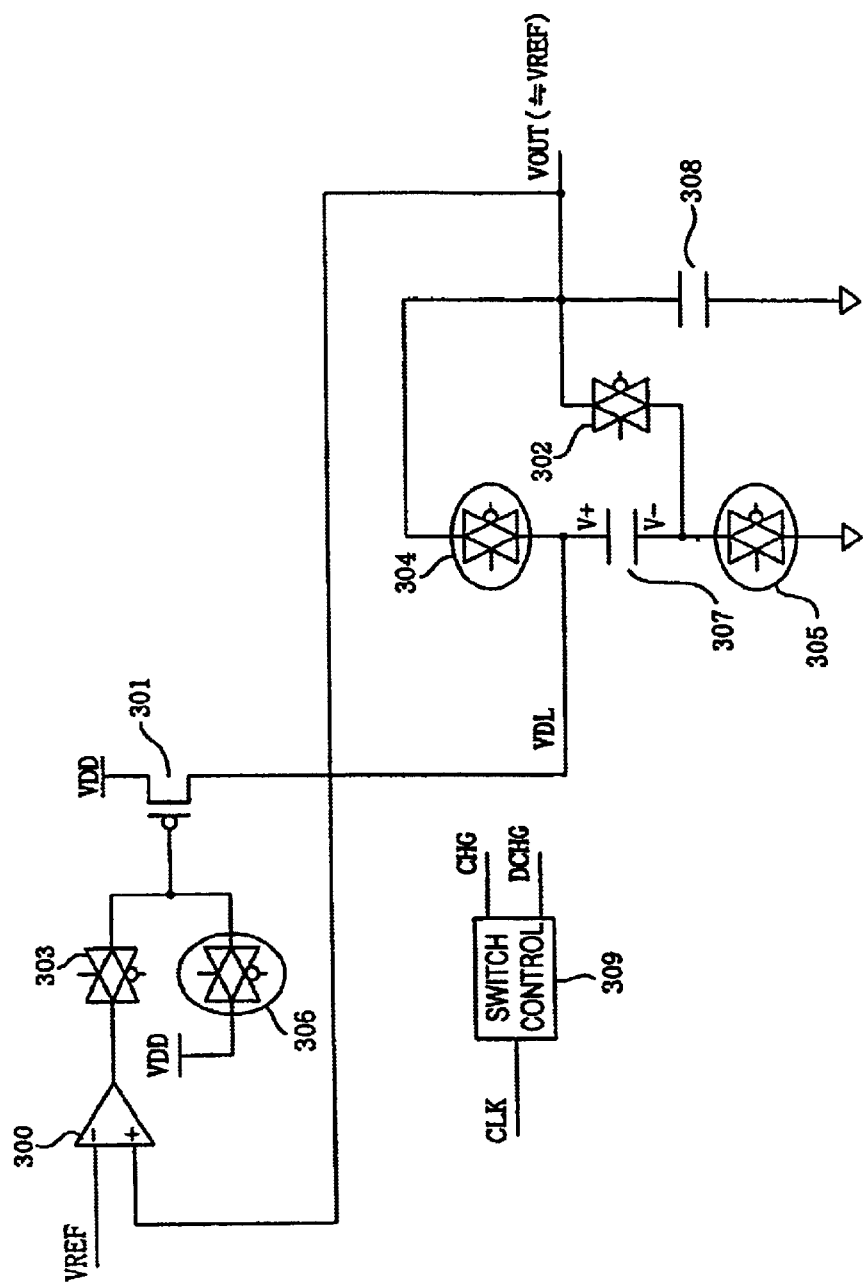
FIG. 4 is a circuit diagram showing a configuration of a power supply device according to a third embodiment of the present invention.

A power supply device according to a third embodiment of the present invention has a circuit configuration wherein the resistor step-down type power supply circuit 100 and the SC type power supply circuit 101 included in the power supply device according to the first embodiment are integrated into one as shown in FIG. 4. Described specifically, the present power supply device comprises an operational amplifier 300, a PMOS transistor (internal node voltage output means) 301, CHG switches 302 and 303 activated by a CHG signal, DCHG switches 304, 305 and 306 activated by a DCHG signal, a voltage dividing capacitor 307, an output capacitor 308 and a switch control circuit 309.

A reference voltage VREF and an output voltage VOUT are inputted to the operational amplifier 300. The CHG switch 303 and the DCHG switch 306, which function as selectors, are electrically connected to the gate of the PMOS transistor 301. Further, either a signal outputted from the operational amplifier 300 or a power supply voltage VDD is inputted to the gate of the PMOS transistor 301. The source of the PMOS transistor 301 is electrically connected to a power supply node (potential VDD) and the drain thereof is electrically connected to an internal node (potential VDL).

The voltage dividing capacitor 307 and the output capacitor 308 are electrically connected in series among the power supply node (potential VDD), the internal node (potential VDL) and ground GND by the PMOS transistor 301 and the CHG switch 302 during a charging cycle. Further, they are electrically connected in parallel between an output voltage VOUT terminal and ground GND by the DCHG switches 304 and 305 during a discharging cycle. The switch control circuit 309 is inputted with a clock signal CLK and thereby outputs a CHG signal for activating the CHG switches 302 and 303 and a DCHG signal for activating the DCHG switches 304, 305 and 306.

The power supply device according to the third embodiment is substantially identical in basic operation to the power supply device according to the first embodiment. A characteristic operation of the power supply device according to the third embodiment will be described below.

During a charging cycle, the PMOS transistor 301 and the CHG switch 302 are respectively brought to a conducting state so that the voltage dividing capacitor 307 and the output capacitor 308 are electrically connected in series between the internal node (potential VDL) and ground GND.

At this time, the internal node voltage VDL is adjusted to 2×VREF obtained by reducing the voltage VDL by (VDD−2×VREF) from the power supply voltage VDD under the operations of the operational amplifier 300 and the PMOS transistor 301 for feeding back the result of comparison between the reference voltage VREF and the output voltage VOUT. Accordingly, the voltage dividing capacitor 307 and the output capacitor 308 are respectively charged by a voltage obtained by dividing the internal node voltage VDL into ½, i.e., the reference voltage VREF.

On the other hand, the DCHG switches 304, 305 and 306 are respectively brought to a conducting state during a discharging cycle. Since, at this time, the power supply voltage VDD is applied to the gate of the PMOS transistor 301 through the DCHF switch 306, the PMOS transistor 301 is cut off. Owing to the transition of the DCHG switches 304 and 305 to the conducting state, the voltage dividing capacitor 307 and the output capacitor 308 are electrically connected in parallel between the output voltage VOUT terminal and ground GND. Since both the capacitors 307 and 308 have been charged by the reference voltage VREF during the charging cycle, an output voltage VOUT coincident with the reference voltage VREF is outputted from the output terminal during the discharging cycle.

By repeating the charging cycle operation and the discharging cycle operation described above at high speed, the power supply device according to the third embodiment outputs the steady DC voltage VOUT (=reference voltage VREF).

On the other hand, the voltage dividing capacitor 108 and the output capacitor 308 are charged under the operations of the PMOS transistor 103 and the CHG switches 104 and 105 (i.e., three elements) during the charging cycle in the case of the power supply device according to the first embodiment. In the power supply device according to the third embodiment in view of such a point, the PMOS transistor 301 for adjusting the internal node voltage VDL assumes even the role of CHG switches for the voltage dividing capacitor 307 and the output capacitor 308. The voltage dividing capacitor 307 and the output capacitor 308 are charged according to the operations of the PMOS transistor 301 and the CHG switch 302 (i.e., two elements). This can bring about the following advantageous effects.

Power consumption of the power supply device is reduced and an improvement in power conversion efficiency is achieved.

A layout area of the power supply device is reduced.

(Fourth Preferred Embodiment)

Figure 5:
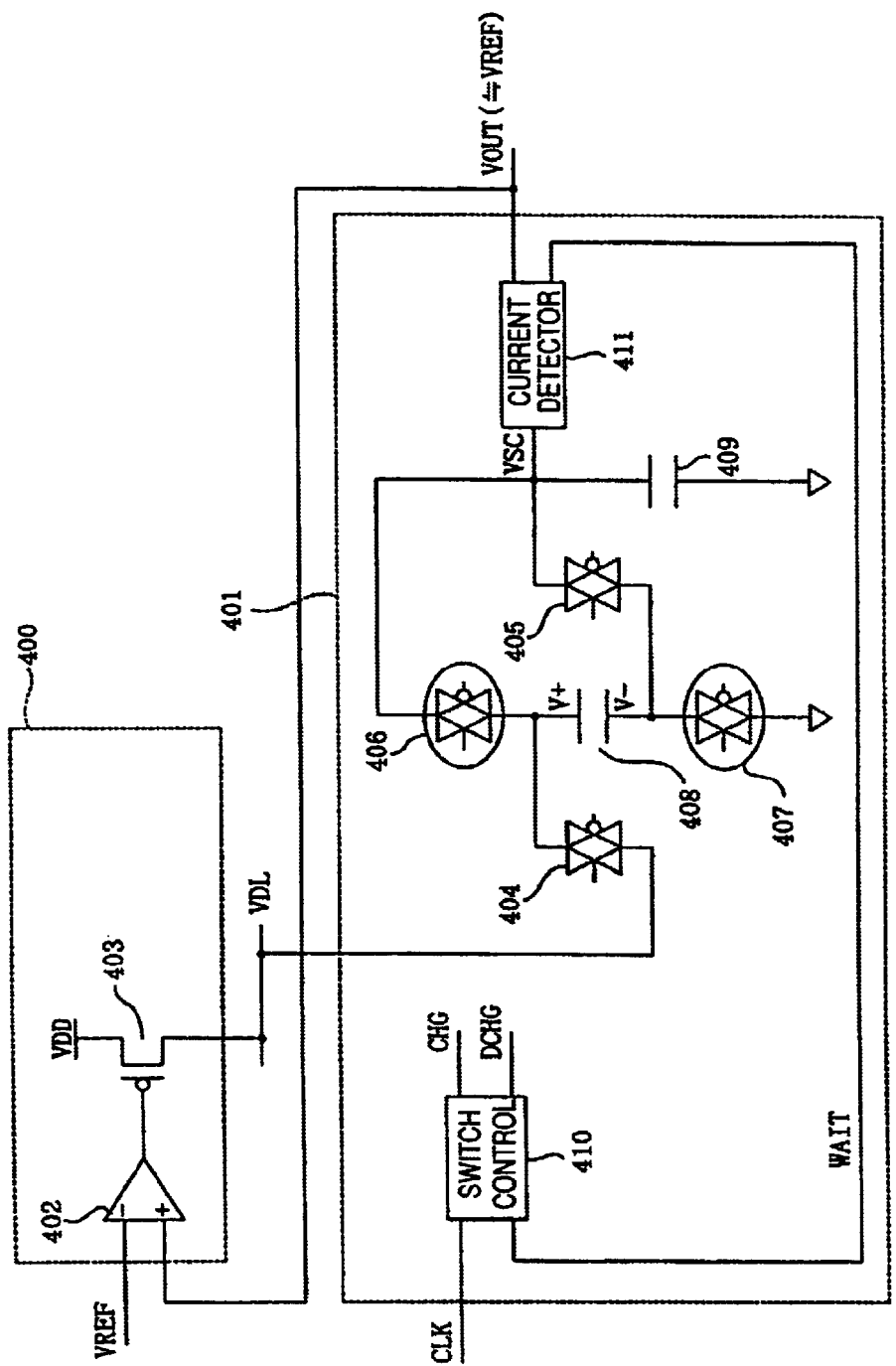
FIG. 5 is a circuit diagram illustrating a configuration of a power supply device according to a fourth embodiment of the present invention.

A power supply device according to a fourth embodiment of the present invention has a configuration wherein a low output current detector circuit 411 for detecting that an output current is brought to a very small current (reaches less than or equal to a predetermined current value), is added to the power supply device according to the first embodiment so as to shown in FIG. 5.

Figure 6:
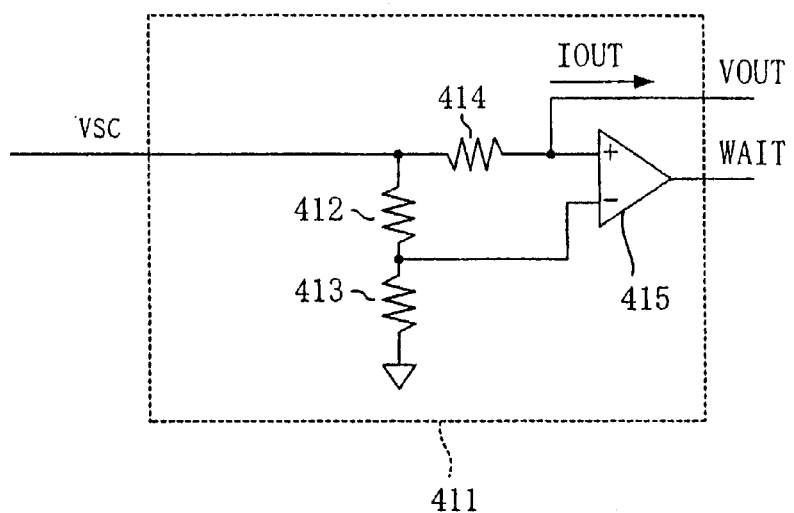
FIG. 6 is a circuit diagram depicting a configuration of a low output current detector circuit included in the power supply device shown in FIG. 5.

As illustrated in FIG. 6 by way of example, the low output current detector circuit 411 comprises a resistor 412 (resistance value R0), a resistor 413 (resistance value R1), a resistor 414 (resistance value R2), and an operational amplifier 415.

The resistor 412 and the resistor 413 are electrically connected in series, so that a detection voltage for detecting a minimum output current is set. A voltage drop developed by an output current IOUT is set by the resistor 414.

The power supply device according to the fourth embodiment is substantially identical in basic operation to the power supply device according to the first embodiment. A characteristic operation of the power supply device according to the fourth embodiment will be described below.

The power supply device according to the fourth embodiment changes the operation of an SC type power supply circuit 401 according to the value of the output current IOUT. Namely, when the output current IOUT is larger than a predetermined value, the present power supply device performs operation similar to the power supply device according to the first embodiment, whereas when the output current IOUT is extremely small (less than or equal to the predetermined value), the present power supply device stops switching operations of CHG switches 404 and 405 and DCHG switches 406 and 407 during a charging cycle and a discharging cycle.

As shown in FIGS. 5 and 6, a voltage inputted to the low output current detector circuit 411 is represented in the form of VSC. The operational amplifier 415 compares a minimum output current detected value (VSC×R1/(R0×R1)) and a voltage drop (VSC−R2×IOUT) developed across the resistor 414 due to the actual flowing of output current IOUT.

When it is judged by the operational amplifier 415 that (VSC×R1/(R0×R1))>(VSC−R2×IOUT), the power supply device according to the fourth embodiment repeats the charging cycle and the discharging cycle in a manner similar to the power supply device according to the first embodiment and thereby outputs an output voltage VOUT therefrom.

On the other hand, when it is determined by the operational amplifier 415 that (VSC×R1/(R0×R1))≦(VSC−R2×IOUT), the operational amplifier 415 outputs a wait (WAIT) signal indicating that the output current IOUT has been extremely reduced. A switch control circuit 410 inputted with the WAIT signal fixes each of a CHG signal and a DCHG signal to an active state or an inactive state. Consequently, the CHG switches 404 and 405 and the DCHG switches 406 and 407 stop their switching operations. The discharge of an electrical charge stored in an output capacitor 409 provides for an output current IOUT at this time.

Since the power supply device according to the fourth embodiment is provided with the low output current detector circuit 411 as described above, the power supply device is capable of stopping the switching operations of the CHG switches 404 and 405 and the DCHG switches 406 and 407 when the output current IOUT is extremely small. Accordingly, power consumption of the power supply device in a low output current region is reduced and besides an improvement in power conversion efficiency in this region is realized.

(Fifth Preferred Embodiment)

Figure 7:
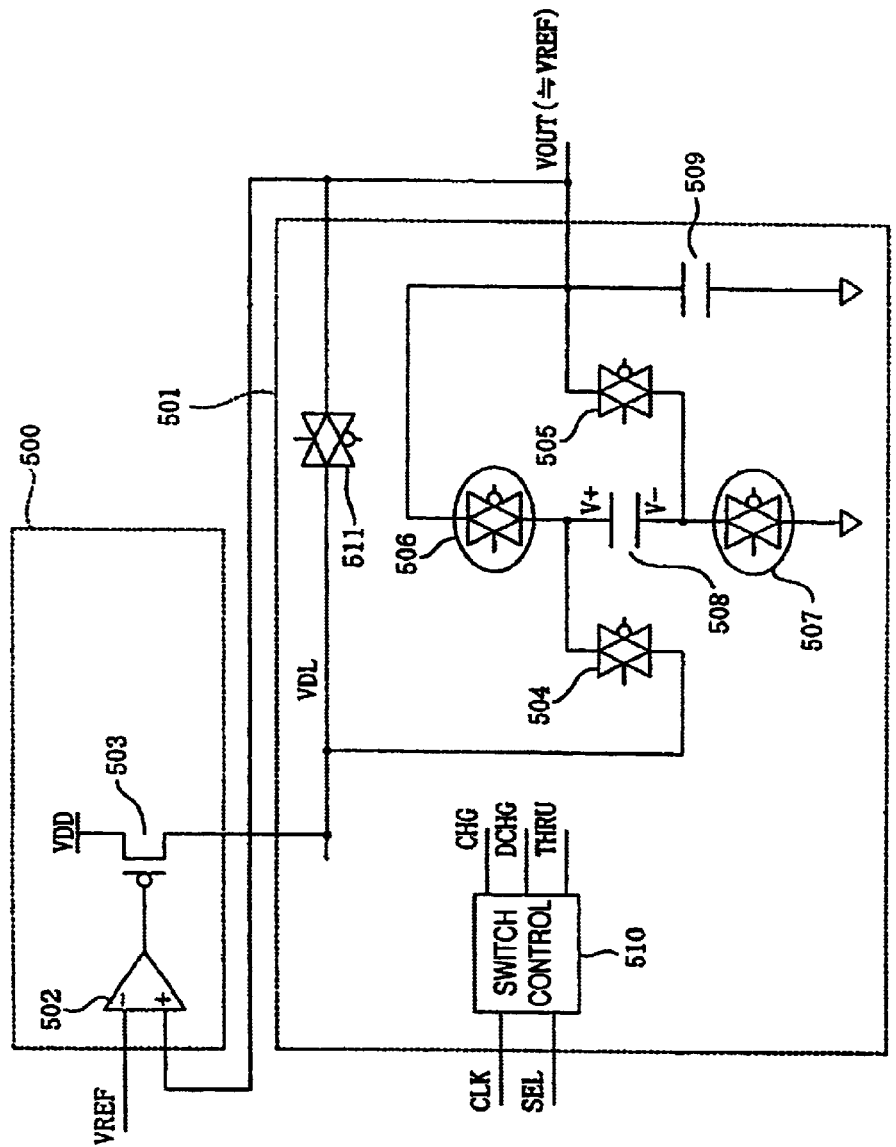
FIG. 7 is a circuit diagram showing a configuration of a power supply device according to a fifth embodiment of the present invention.
Figure 8:
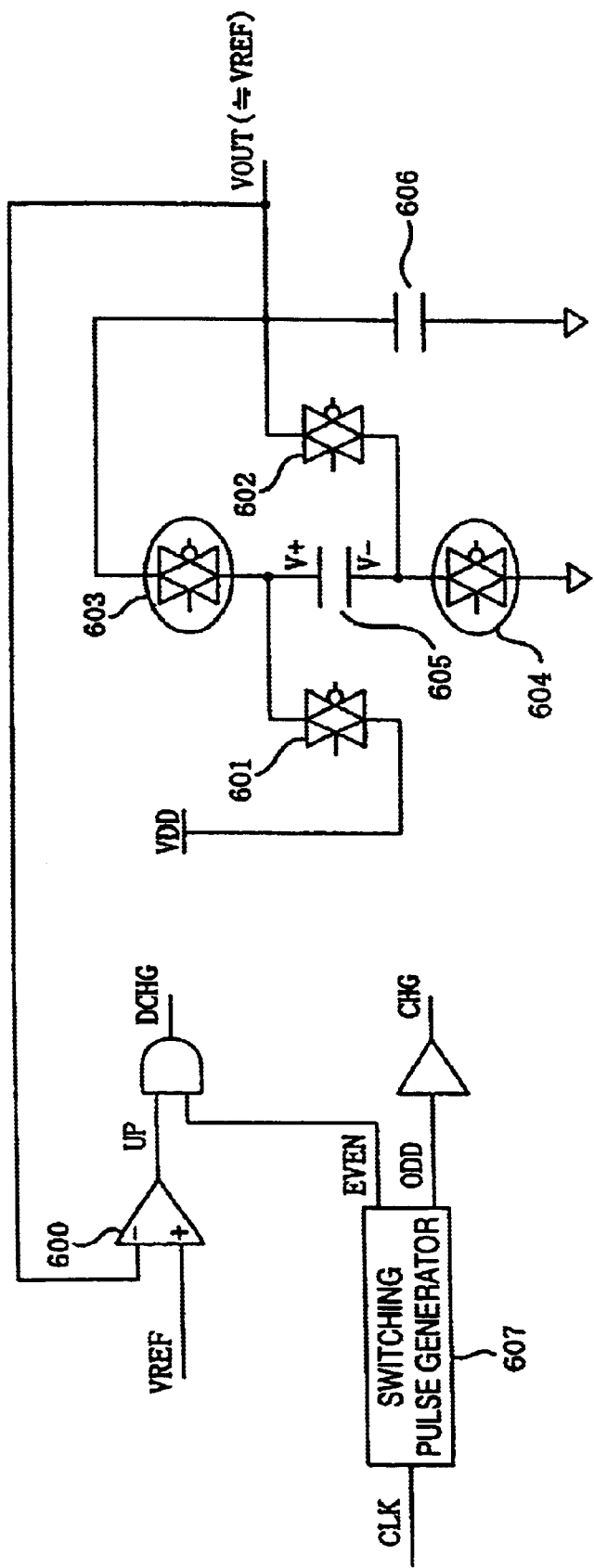
FIG. 8 is a circuit diagram illustrating a configuration of a conventional power supply device.
Figure 9:
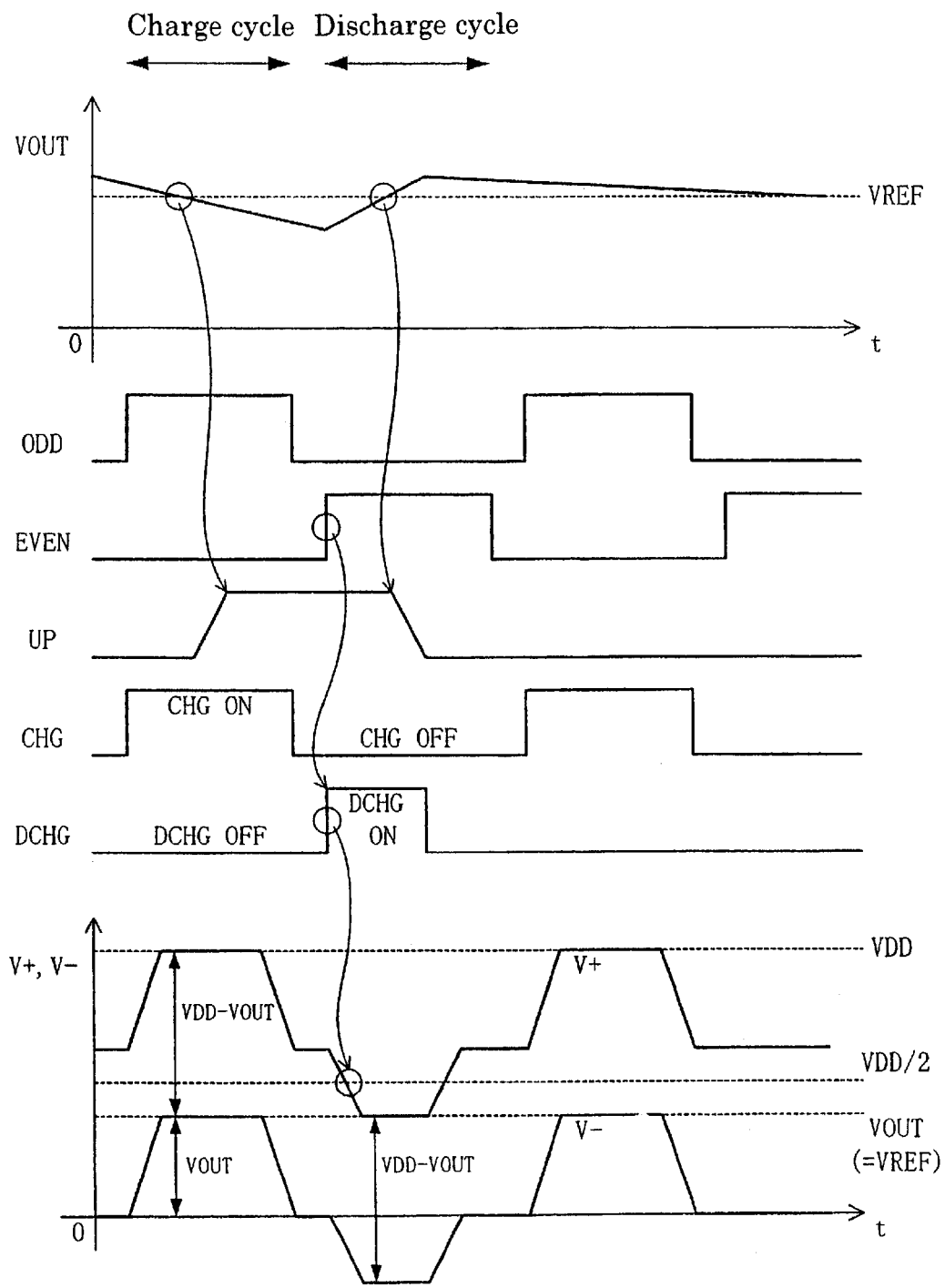
FIG. 9 is a waveform diagram showing the operation of the power supply device shown in FIG. 8.

A power supply device according to a fifth embodiment of the present invention has a configuration wherein a THRU switch 511 activated by a THRU signal is added to the power supply device according to the first embodiment so as to be placed between an internal node (potential VDL) and an output voltage VOUT terminal as shown in FIG. 7. According to the power supply device according to the fifth embodiment, either one of the direct output of an output voltage VOUT by a resistor step-down type power supply circuit 500 alone or the output of an output voltage VOUT by a combination of the resistor step-down type power supply circuit 500 and an SC type power supply circuit 501 in a manner similar to the power supply device according to the first embodiment can be selected.

A switch control circuit 510, which belongs to the SC type power supply circuit 501, is inputted with a clock signal CLK and a select (SEL) signal and outputs a CHG signal for activating CHG switches 504 and 505, a DCHG signal for activating DCHG switches 506 and 507, and the THRU signal for activating the THRU switch 511. Incidentally, the SEL signal is a signal for selecting either the use of only the resistor step-down type power supply circuit 500 or the combined use of the resistor step-down type power supply circuit 500 and the SC type power circuit 501 as a source for generating the output voltage VOUT.

The power supply device according to the fifth embodiment is substantially identical in basic operation to the power supply device according to the first embodiment. A characteristic operation of the power supply device according to the fifth embodiment will be described below.

When it is desired to obtain the output voltage VOUT by the power supply device according to the fifth embodiment, the SEL signal is used to select either the use of only the resistor step-down type power supply circuit 500 or the combined use of the resistor step-down type power supply circuit 500 and the SC type power supply circuit 501 as the output voltage VOUT generating source.

When the generation of the output voltage VOUT by the latter, i.e., the combined use of the resistor step-down type power supply circuit 500 and the SC type power supply circuit 501 is selected, the power supply device according to the fifth embodiment performs operation similar to the power supply device according to the first embodiment.

When the generation of the output voltage VOUT by the former, i.e., the resistor step-down type power supply circuit 500 alone is selected, the switch control circuit 510 outputs a CHG signal and a DCHG signal each fixed to an inactive state to thereby bring the CHG switches 504 and 505 and the DCHG switches 506 and 507 into a non-conducting state respectively. Further, the switch control circuit 510 outputs a THRU signal held in an active state to thereby bring the THRU switch 511 into a conducting state. Owing to the operation of the power supply device according to the fifth embodiment in this way, the output voltage VOUT is directly outputted from the resistor step-down type power supply circuit 500 to the outside. Incidentally, the output voltage VOUT coincides with a reference voltage VREF.

According to the power supply device showing the fifth embodiment as described above, the selection of either the use of only the resistor step-down type power supply circuit 500 or the combined use of the resistor step-down type power supply circuit 500 and the SC type power supply circuit 501 as the output voltage VOUT generating source can be performed by means of the SEL signal. Accordingly, the following advantageous effects are obtained.

It is possible to output a voltage that belongs to a region difficult to allow the SC type power supply circuit 501 to output it.

According to a power supply voltage VDD and a condition for a desired output voltage VOUT, either one of the resistor step-down type power supply circuit 500 alone or the combination of the resistor step-down type power supply circuit 500 and the SC type power supply circuit 501 can be selected. For example, power conversion efficiency may preferably be adopted as criteria for its selection.

While the preferred embodiments according to the present invention have been described with reference to the accompanying drawings, the present invention is not limited to the embodiments. It will be apparent to those skilled in the art that various changes or modifications can be supposed to be made to the invention within the scope of a technical idea described in the following claims. It is understood that those modification and changes should fall within the technical scope of the present invention.

According to the power supply device according to the present invention as described above, a voltage adjusted to a desired value can stably be outputted. Further, a reduction in power consumption and an improvement in power conversion efficiency are realized. It is also possible to prevent the generation of switching noise that exerts a bad influence on peripheral circuits, and a change in ground potential.

What is claimed is:

1. A power supply device, wherein connected states of pluralities of capacitors are changed during a charging cycle and a discharging cycle to thereby perform DC—DC power conversion, comprising:

a resistor step-do type power supply circuit;

a plurality of switched capacitor type power supply circuits, each having a plurality of capacitors each of the plurality of circuits for respectively outputting different output voltages according to the number of capacitors thereof and a difference between series/parallel switching operations;

wherein an output produced from said resistor step-down type power supply circuit is inputted to each switched capacitor type power supply circuit said resistor step-down type power supply circuit outputs a voltage switchable by the respective capacitors lying within said each switched capacitor type power supply circuit during both the charging and discharging cycles in an equilibrium state in which the same potential is applied to the respective capacitors, and said each switched capacitor type power supply circuit performs series/parallel switching operations of the capacitors thereof according to a switching pulse constant in duty ratio; and a VDD-VREF level detector circuit for detecting the level of a power supply voltage (VDD) and the level of a reference voltage (VREF) used as a desired output voltage;

whereby an optimum switched capacitor type power supply circuit is selectable.

2. A power supply device having a plurality of capacitors wherein connected states of the plurality of capacitors are changed during a charging and a discharging cycles to thereby perform DC—DC power conversion, comprising a resistor step-down type power supply circuit; and a switched capacitor type power supply circuit, wherein an output produced from said resistor step-down type power supply circuit is inputted to said switched capacitor type power supply circuit, said resistor step-down type power supply circuit outputs a voltage switchable by the respective capacitors lying within said switched capacitor type power supply circuit during both the charging and discharging cycles in an equilibrium state in which the same potential is applied to the capacitors, and said switched capacitor type power supply circuit performs series/parallel switching operations according to a switching pulse constant in duty ratio, further including a low output current detector circuit for detecting that an output current value is extremely small, wherein said switched capacitor type power supply circuit stops a switching operation when the detection thereof is performed.

3. A power supply device having a plurality of capacitors, wherein connected states of the plurality of capacitors are changed during a charging and a discharging cycles to thereby perform DC—DC power conversion, comprising:

a resistor step-down type power supply circuit; and a switched capacitor type power supply circuit;

wherein an output produced from said resistor step-down type power supply circuit is inputted to said switched capacitor type power supply circuit, said resistor step-down type power supply circuit outputs a voltage switchable by the respective capacitors lying within said switched capacitor type power supply circuit during both the charging and discharging cycles in an equilibrium state in which the same potential is applied to the capacitors, and said switched capacitor type power supply circuit performs series/parallel switching operations of the capacitors according to a switching pulse constant in duty ratio; and wherein either a single operation of said resistor step-down type power supply circuit or a combined operation of said resistor step-down type power supply circuit and said switched capacitor type power supply circuit is selectable with respect to circuit operations.

4. A power supply device, comprising a switched capacitor type power supply circuit for charging a plurality of built-in capacitors by using an internal node voltage during a charging cycle and discharging the plurality of charged capacitors during a discharging cycle to thereby generate an output voltage corresponding to the internal node voltage;

an internal node voltage adjusting circuit for comparing the output voltage and a reference voltage adjusted to a predetermined level and adjusting the internal node voltage according to the result of comparison; and output voltage selecting means for selecting either the internal node voltage or the output voltage and outputting the same to the outside.

5. A power supply device, comprising:

a switched capacitor type power supply circuit for charging a plurality of built-in capacitors by using an internal node voltage during a charging cycle and discharging the plurality of charged capacitors during a discharging cycle to thereby generate an output voltage corresponding to the internal node voltage;

an internal node voltage adjusting circuit for comparing the output voltage and a reference voltage adjusted to a predetermined level and adjusting the internal node voltage according to the result of comparison;

a second switched capacitor type power supply circuit for charging a plurality of built-in second capacitors by use of the internal node voltage during the charging cycle and discharging the charged second capacitors during the discharging cycle to thereby generate a second output voltage corresponding to the internal node voltage, and power supply circuit selecting means for selecting either said switched capacitor type power supply circuit or said second switched capacitor type power supply circuit and bringing the same to an enable state.

6. A power supply device according to claim 5, wherein said power supply circuit selecting means selects either said switched capacitor type power supply circuit or said second switched capacitor type power supply circuit with the level of the reference voltage as the reference.

7. A power supply device according to claim 5, wherein said second switched capacitor type power supply circuit detects the value of a second output current generated based on the second output voltage and stops the operation of charging of the plurality of second capacitor and the operation of discharging of the same when the detected value is smaller than a predetermined value.

8. A power supply device according to claim 5, further including output voltage selecting means for selecting any of the internal node voltage, the output voltage and the second output voltage and outputting the selected voltage to the outside.

9. A power supply device comprising:

a switched capacitor type power supply circuit for charging a plurality of built-in capacitors by using an internal node voltage during a charging cycle and discharging the plurality of charged capacitors during a discharging cycle to thereby generate an output voltage corresponding to the internal node voltage; and an internal node voltage adjusting circuit for comparing the output voltage and a reference voltage adjusted to a predetermined level and adjusting the internal node voltage according to the result of comparison;

wherein said internal node voltage adjusting circuit includes internal node voltage output means for outputting the internal node voltage during a period other than the discharging cycle.

* * * * *